No. 889,319. PATENTED JUNE 2, 1908.
E. B. MARTIN.
NUT LOCK.
APPLICATION FILED JAN. 3, 1908.

WITNESSES
Chas. K. Davies
Wilson A. Chase

INVENTOR
Elijah B. Martin
by William O. Augh
Attorney

UNITED STATES PATENT OFFICE.

ELIJAH B. MARTIN, OF TEKAMAH, NEBRASKA.

NUT-LOCK.

No. 889,319.  Specification of Letters Patent.  Patented June 2, 1908.

Application filed January 3, 1908. Serial No. 409,210.

*To all whom it may concern:*

Be it known that I, ELIJAH B. MARTIN, a citizen of the United States, residing a Tekamah, in the county of Burt and State of Nebraska, have invented certain new and useful Improvements in Nut-Locks, of which the following is a specification.

The present invention relates to improvements in nut locks, and has for its object the provision of a device of this character which will be strong and durable, easily manipulated, and one which will perform the function of holding the nut locked permanently on the bolt, as will be more fully pointed out hereinafter.

In the accompanying drawings I have illustrated one example of the physical embodiment of my invention, constructed according to the best mode I have so far devised for the practical application of the principles.

Figure 1:
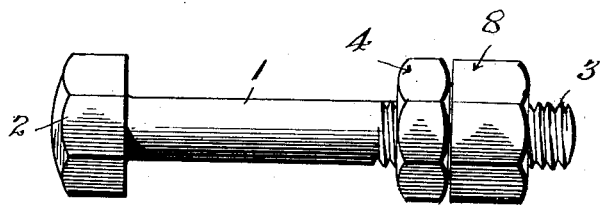
Figure 2:
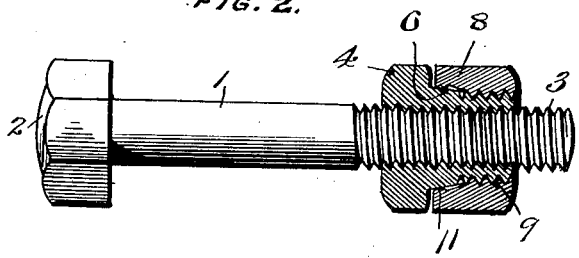
Figure 3:
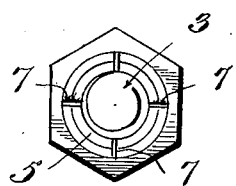
Figure 4:
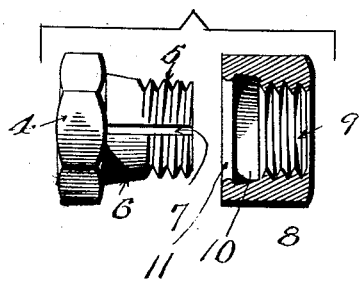

Referring to the drawings: Figure 1 is a side elevation of the device, showing both nuts, (the nut secured upon a bolt, and the lock nut in operative position) and bolt. Fig. 2 is a view similar to Fig. 1, the two nuts being shown in section. Fig. 3 is an end view of the parts as seen in Fig. 1 from the right end, and Fig. 4 illustrates the bolt nut in elevation and the lock nut adjacent thereto, in section.

The invention contemplates the use of a nut to perform the functions of an ordinary nut and provided with right hand threads for engagement with complementary threads of a bolt, and a lock nut provided with interior left hand threads for engagement with complementary exterior threads upon an extension of the bolt nut, the lock nut to act as a compressor nut, which through the medium of certain devices and constructions, compresses the threads of the bolt nut permanently on the bolt threads.

In the drawings the numeral 1 designates a bolt of suitable construction and convenient size; 2, the bolt head; 3, the threaded end of the bolt; 4, the bolt nut proper fashioned to receive a wrench or other tool for turning; 5, the threaded extension of the bolt nut; 6, a smooth tapered portion of said extension; 7, a series of slits or kerfs, four being illustrated cut in and extending the length of the extension at diametrically opposite points therein; 8, the lock or compresser nut, fashioned to receive a wrench or other tool for turning; 9, interior threads cut in the nut 8; 10, a smooth annular surface adjacent said threads 9; 11, a ring or annular projection formed at the inner end of the nut 8.

It will be observed that the bolt threads and interior threads of the bolt nut are right hand threads, that is, they extend in a direction so that the nut is screwed onto the bolt from left to right, and that the exterior threads of the extension 5 and interior threads 9 of the compressor nut are left hand threads, requiring that the nut 8 be screwed from right to left, when securing the bolt nut, thus securely clamping the nut 4 through the medium of the extension on the bolt.

In operating the device, the bolt nut is screwed home. The compressor nut is then entered over the extension of the bolt nut and turned in the opposite direction from that in which the bolt nut was turned. As the nut 8 advances upon the extension of the bolt nut, the annular ring or projection 11 rides over the tapered portion 6 of the extension and compresses said extension upon the threads of the bolt, the kerfs or slits 7 allowing a compression of the extension in manner well understood, and the bolt nut is thus firmly locked upon its threads.

The construction whereby the bolt nut and compressor nut are turned and screwed home in opposite directions is an essential feature of my invention, and the means employed *i. e.* the tapered portion of the extension and the annular ring to "ride down" the extension, for securing the bolt nut on the bolt threads I consider a simple and efficient means for the purpose.

By the use of the bolt nut with its extension threaded its entire length on the interior, and threaded exteriorly a part of its length, combined with the compressor nut provided with threads only a part of its length, the compressor nut may be screwed into close contact with the bolt nut, and thus be compacted in order to present as little obstruction as possible, yet at the same time affording ample surface for the use of a tool.

When the compressor nut is screwed home upon the bolt nut the latter is held in permanent position.

From the above description taken in connection with the drawings it is evident that I have provided a lock nut which will fulfil the conditions set forth as the object of the invention.

Having thus fully described my invention, what I claim as new and desire to secure by Letters Patent is:—

A bolt-engaging-nut interiorly threaded and having an externally threaded extension, said extension provided with kerfs and formed with a smooth tapering portion; combined with a compressor nut having internal threads disposed oppositely to the threads of the bolt nut and extending part way through said nut, and an annular projecting ring formed at the end of said nut larger in diameter than the diameter of the threads thereon for engagement with said tapering portion of the extension.

In testimony whereof I affix my signature in presence of two witnesses.

ELIJAH B. MARTIN.

Witnesses:
HENRY M. HOPEWELL,
JOHN P. MERRITT.